(12) United States Patent
Scheyer (10) Patent No.: US 7,676,939 B2
(45) Date of Patent: Mar. 16, 2010

(54) CROSS LASER DEVICE FOR INSTALLATION OF PLATE-SHAPED OR BOARD-SHAPED FLOOR COVERING ELEMENTS

(75) Inventor: Wolfgang Scheyer, Götzis (AT)

(73) Assignee: SOLA Immobilienverwaltungs GmbH, Gotzis (AT)

( * ) Notice: Subject to any disclaimer, the term of this patent is extended or adjusted under 35 U.S.C. 154(b) by 121 days.

(21) Appl. No.: 11/984,927

(22) Filed: Nov. 26, 2007

(65) Prior Publication Data

US 2008/0301955 A1 Dec. 11, 2008

(30) Foreign Application Priority Data

Nov. 24, 2006 (AT) .............................. A 1955/2006

(51) Int. Cl.
*G01C 15/02* (2006.01)
*G01B 11/26* (2006.01)
*B43L 13/00* (2006.01)

(52) U.S. Cl. ..................... 33/286; 33/276; 33/DIG. 21
(58) Field of Classification Search ................... 33/286, 33/276, 277, DIG. 21, 535
See application file for complete search history.

(56) References Cited

U.S. PATENT DOCUMENTS

| D328,436 S | 8/1992 | Fuerst et al. | |
|---|---|---|---|
| 5,218,770 A * | 6/1993 | Toga | 33/276 |
| 6,065,217 A * | 5/2000 | Dong | 33/290 |
| D432,930 S | 10/2000 | Sanoner | |
| 6,202,312 B1 * | 3/2001 | Rando | 33/227 |
| 6,694,629 B2 * | 2/2004 | Goodrich | 33/286 |
| 7,392,591 B2 * | 7/2008 | Milligan et al. | 33/286 |
| 7,434,322 B2 * | 10/2008 | Walser et al. | 33/286 |
| 2002/0066191 A1 * | 6/2002 | Hsu | 33/286 |
| 2003/0009891 A1 * | 1/2003 | Ohtomo et al. | 33/286 |
| 2006/0112576 A1 * | 6/2006 | Lu | 33/286 |

FOREIGN PATENT DOCUMENTS

AT 504 565 6/2008

(Continued)

OTHER PUBLICATIONS

Austrian Search Report issued Oct. 10, 2007 in the Austrian Patent Application No. A 1955/2006.

(Continued)

*Primary Examiner*—Christopher W Fulton
(74) *Attorney, Agent, or Firm*—Wenderoth, Lind & Ponack, L.L.P.

(57) ABSTRACT

A cross laser device for installing plate- or board-shaped floor covering elements on a flat substrate includes a housing which can be positioned on the substrate by feet, and at least one first and one second laser disposed within the housing, by which first and second laser beams emerging through first and second front light exits of the housing can be generated for the formation of first and second marking lines on the substrate, which marking lines intersect at right angles at an intersection point spaced apart from the light exits. An underside of the housing is spaced apart from the substrate such that first and second clearance zones beneath the housing extend continuously from first and second side edges of the housing up to first and second vertical planes, respectively, the first and second laser beams being located in the first and second vertical planes, respectively.

13 Claims, 6 Drawing Sheets

FOREIGN PATENT DOCUMENTS

| | | |
|---|---|---|
| CH | 134174 | 6/2009 |
| CN | 101226060 | 7/2008 |
| CN | 200730158194.9 | 7/2008 |
| CN | 200730158197.2 | 7/2008 |
| CN | 200730158195.3 | 8/2008 |
| CN | 200730158196.8 | 8/2008 |
| CN | 200730158198.7 | 8/2008 |
| EM | 000646864-0001 | 1/2007 |
| EM | 000646864-0002 | 1/2007 |
| EM | 000646864-0003 | 1/2007 |
| EM | 000646864-0004 | 1/2007 |
| EM | 000646864-0005 | 1/2007 |
| EM | 000646864-0006 | 1/2007 |
| EM | 000646864-0007 | 1/2007 |
| EM | 000646864-0008 | 1/2007 |
| EM | 000646864-0009 | 1/2007 |
| EM | 000646864-0010 | 1/2007 |
| EP | 0 819 911 | 6/2002 |
| EP | 1 925 911 | 5/2008 |
| WO | 2006/125463 | 11/2006 |

OTHER PUBLICATIONS

Kreuzlinienlaser (Crossline laser). Bedienungsanleitung (Instruction Sheet) [online] Westfalia Werkzeug GmbH & Co KG, Oct. 1, 2005 [downloaded on Oct. 8, 2007]. Downloaded from the Internet <URL: http://www2.westfalia.de/service/dat_down.php?datei_id=53941>.

* cited by examiner

CROSS LASER DEVICE FOR INSTALLATION OF PLATE-SHAPED OR BOARD-SHAPED FLOOR COVERING ELEMENTS

BACKGROUND OF THE INVENTION a) Field of the Invention

The invention relates to a cross laser device for installing plate- or board-shaped floor covering elements, in particular tiles, on a flat substrate, with a housing which can be positioned on the substrate and within which at least one first and one second laser are disposed, by which first and second laser beams, emitted through first and second front light exits of the housing, can be generated for the formation of first and second marking lines on the substrate, which marking lines intersect at right angles at an intersection point spaced apart from the light exits.

b) Description of Related Prior Art

Such cross laser devices are available, for example, by the trade name Westfalia Kreuzlinienlaser and are employed for installing floor covering elements, for example tiles. The point of intersection of the marking lines or their extensions, produced by the laser beams on the substrate, is conventionally located just in front of the housing of the cross laser device. In addition to cross laser devices including only two lasers, cross laser devices are also known in which third and fourth lasers emit on the housing side, facing away from the point of intersection of the first and second marking lines or their extensions, third and fourth laser beams producing marking lines located in a common straight line with the first and second marking lines on the other side of the housing.

PROBLEM ADDRESSED BY THE INVENTION AND SUMMARY OF THE INVENTION

An important problem addressed by the invention is providing an improved cross laser device of the above described type through which the installation of floor covering elements, for example tiles, is facilitated.

A cross laser device according to the invention for installing plate- or board-shaped floor covering elements, such as for example tiles, on a flat substrate comprises:

a housing which can be positioned on the substrate by means of feet of the cross laser device, at least one first and one second laser disposed within the housing, by which can be generated first and second laser beams emitted through first and second front light exits of the housing for the formation of first and second marking lines on the substrate, which marking lines intersect at right angles at a point of intersection spaced apart from the light exits, an underside of the housing which is spaced apart from the substrate when the housing is positioned on the substrate by means of the feet, wherein beneath the housing a first clearance zone extends from a first side edge of the housing at least to a first vertical plane in which lies the first laser beam, which clearance zone expands continuously throughout the entire region between the first vertical plane and the adjacent first side edge, and wherein beneath the housing a second clearance zone extends from a second side edge of the housing at least up to a second vertical plane in which lies the second laser beam, which space expands continuously throughout the entire region between the second vertical plane and the adjacent second side edge.

The cross laser device according to the invention consequently comprises first and second clearance zones by means of the feet of the cross laser device beneath the housing. A particular clearance zone extends continuously beneath the full extent of the housing into that half-space, delimited by the particular vertical plane, in which is located the side edge of the housing adjacent to this vertical plane. These clearance zones permit sliding one or several floor covering elements or sections thereof under the housing up to the particular vertical plane, and specifically over the full horizontal length of a particular vertical plane across which the vertical plane penetrates the housing. The alignment of the floor covering elements along the marking lines or their imaginary extensions into the region beneath the housing is thereby facilitated. The height of these clearance zones is herein matched to the floor covering elements to be installed. The height of the clearance zones over their full extent is advantageously at least 7 mm, preferably more than 10 mm, with the sliding of conventional tiles becoming possible even in the presence of an applied adhesion layer.

It is preferred that the distances between the first and second light exits and the point of intersection are in each instance at least 30 mm, preferably at least 50 mm. The installation work is thereby further facilitated.

In an advantageous embodiment of the invention the cross laser device further comprises third and fourth lasers for generating third and fourth laser beams which emerge from the housing through third and fourth rear light exits and by which on the substrate third and fourth marking lines can be formed. The third marking line is herein located in a common straight line with the first marking line and the fourth marking line is in a common straight line with the second marking line.

BRIEF DESCRIPTION OF THE DRAWING

In the Figures depict:

FIG. 2 a top view with the lasers switched on,

DESCRIPTION OF THE PREFERRED EMBODIMENT EXAMPLES

An embodiment example of a cross laser device according to the invention is depicted in the Figures. The cross laser device comprises a housing 1, within which lasers 2, 3 comprising first and second laser diodes are provided for the generation of first and second laser beams 4, 5. The first and second laser beams are emitted from the housing 1 through first and second front light exits 6, 7. These light exits 6, 7 are formed by windows. Through an inclined disposition of the first and second lasers and an inclined path entailed herein of the first and second laser beams with respect to the flat substrate 17, on which the cross laser device is positioned, first and second marking lines 4, 5 are produced by the first and second laser beams on the substrate 17, and specifically starting at a relatively short distance from the first and second light exit 6, 7.

Figure 2:
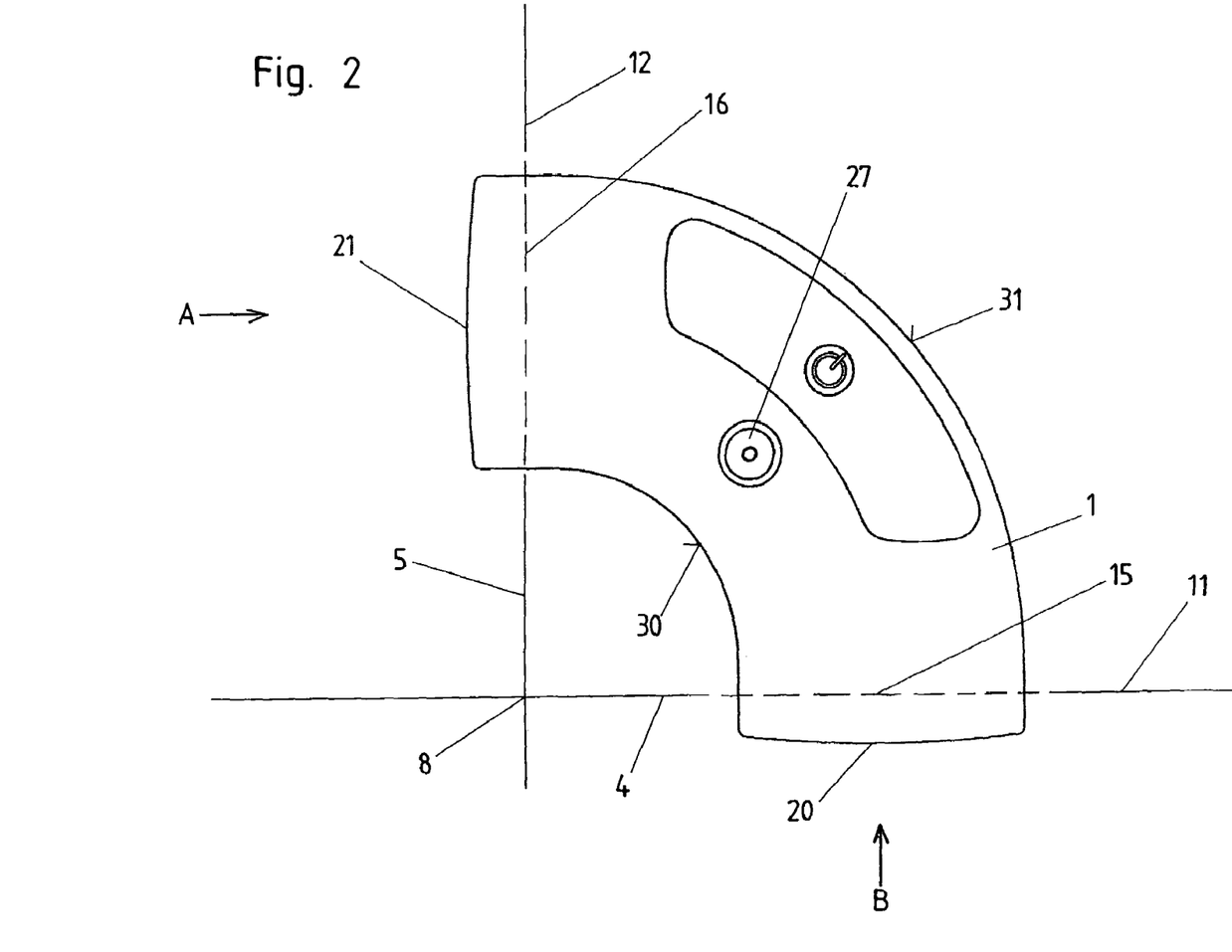

The first and second laser beams, or the marking lines 4, 5 produced by them, intersect at right angles at an intersection point 8. The distance between the first light exit 6 and the intersection point 8 is preferably equal to the distance between the second light exit 7 and the intersection point 8. These lengths are, for example, 75 mm each.

Figure 6:
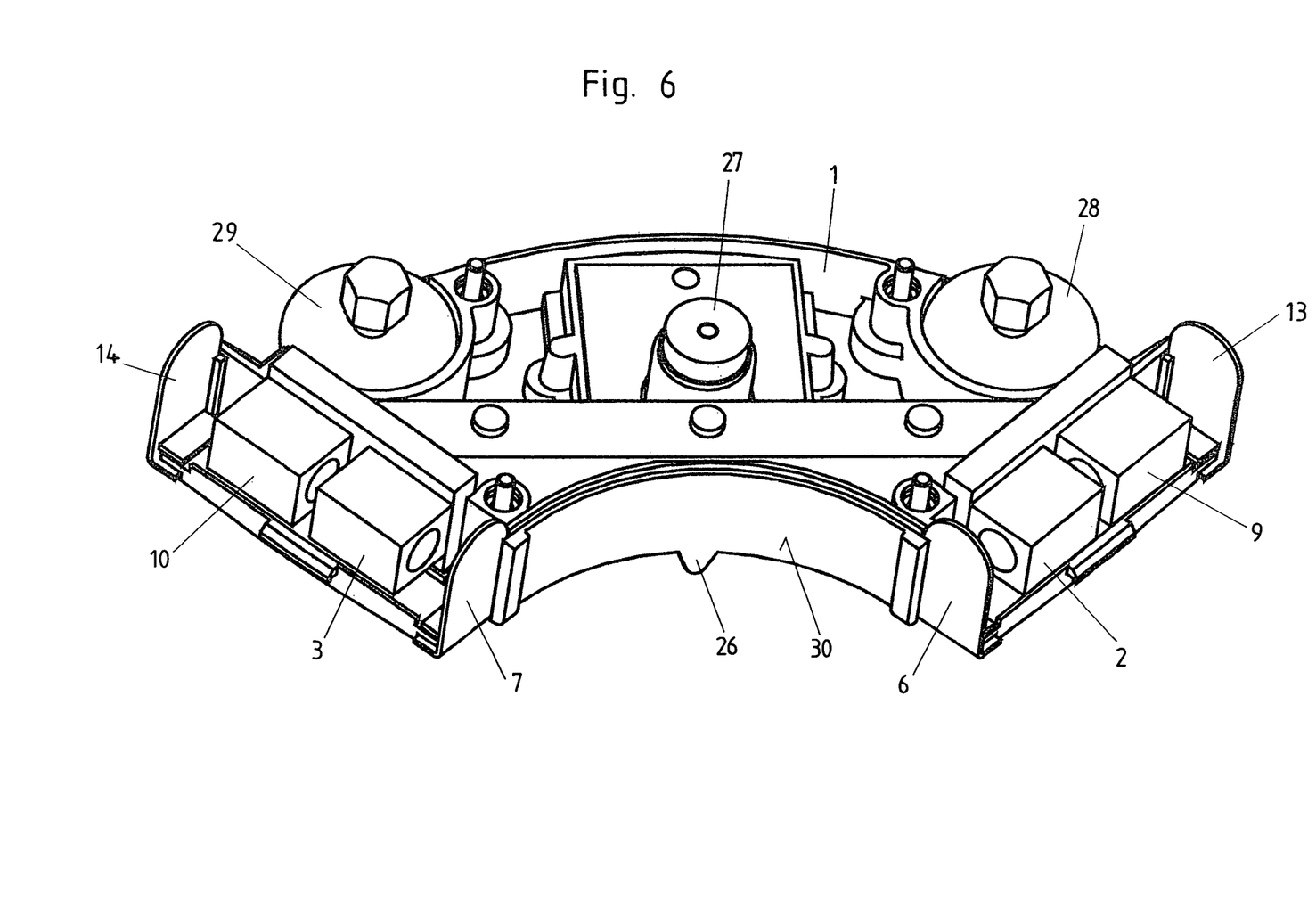
FIG. 6 a perspective view analogous to FIG. 1, however without the upper housing shell.

In the depicted embodiment example, further, within the housing 1 third and fourth lasers 9, 10 comprising third and fourth laser diodes are disposed, which generate third and fourth laser beams which emerge from the housing 1 through rearward third and fourth light exits 13, 14. The third and fourth light exits 13, 14 are again formed by windows. Through an inclined disposition of the third and fourth lasers 9, 10, analogously to the first and second lasers 2, 3, third and fourth marking lines 11, 12 are produced by the laser beams extending at an inclination with respect to the substrate 17, and specifically starting at a minimal distance from the particular light exit 13, 14. The third marking line 11 and the first marking line 4 are located in a common first straight line 15 and the fourth marking line 12 and the second marking line 5 are located in a common second straight line 16. The third and fourth marking lines 11, 12, consequently, continue the first and second marking lines 4, 5 on the backside of housing 1.

The lengths of the first and second marking lines 4, 5 are each preferably at least 4 m. The lengths of the third and fourth marking lines 11, 12 are also preferably at least 4 m.

The distances between the first and second light exits 6, 7 and the start of the particular associated first and second marking line 4, 5 are preferably less than 25 mm, for example 10 to 15 mm. It is in any case preferred that the intersection point 8 is produced by marking lines 4, 5.

The distances between the third and fourth light exits 13, 14 and the starts of the particular associated marking line 11, 12 are preferably less than 25 mm, for example approximately 10 to 15 mm.

Consequently, a nearly completely limited cross is produced on the substrate 17.

Figure 3:
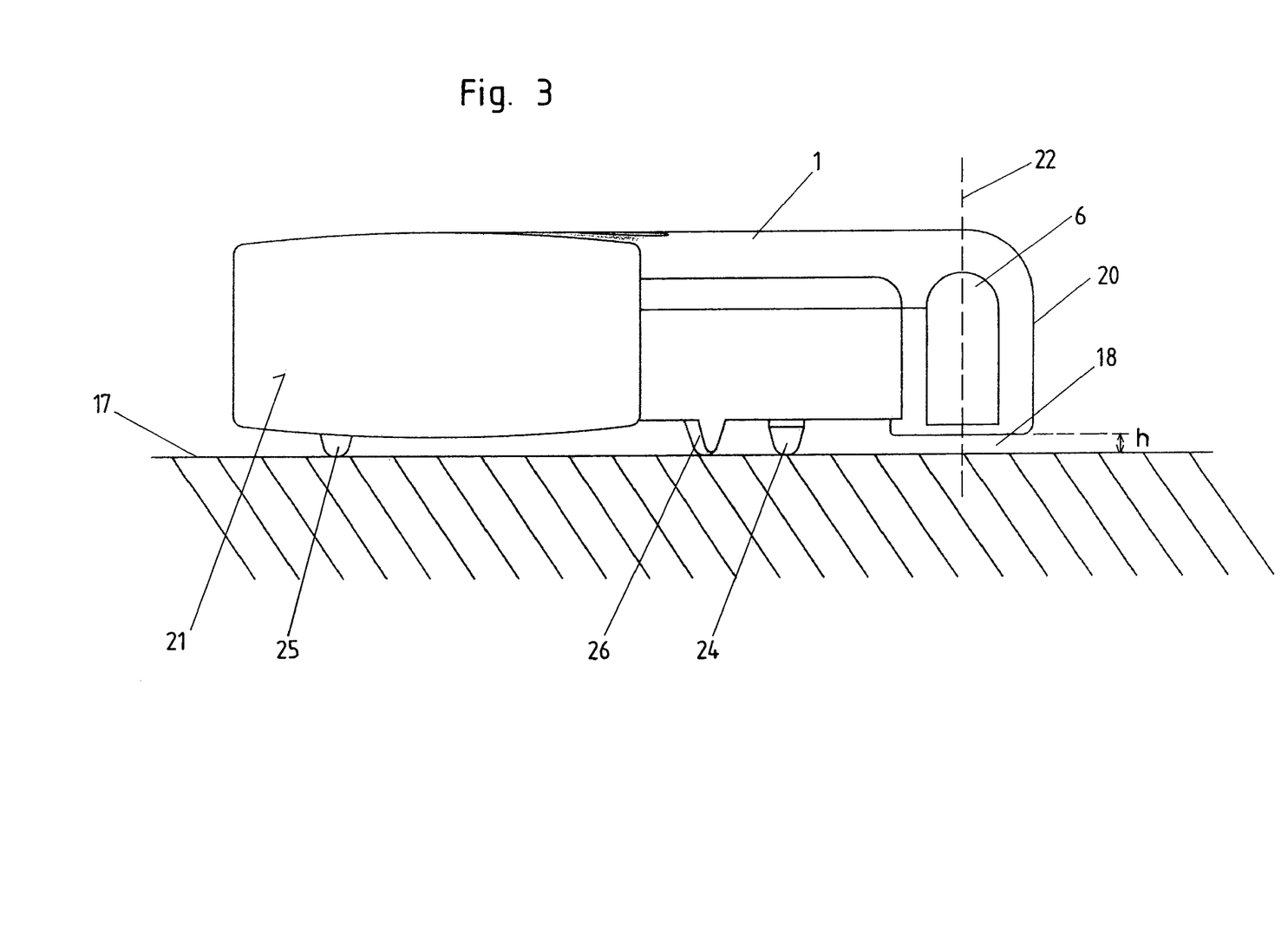
FIG. 3 and FIG. 4 side views in the direction of arrow A and B of FIG. 2.
Figure 4:
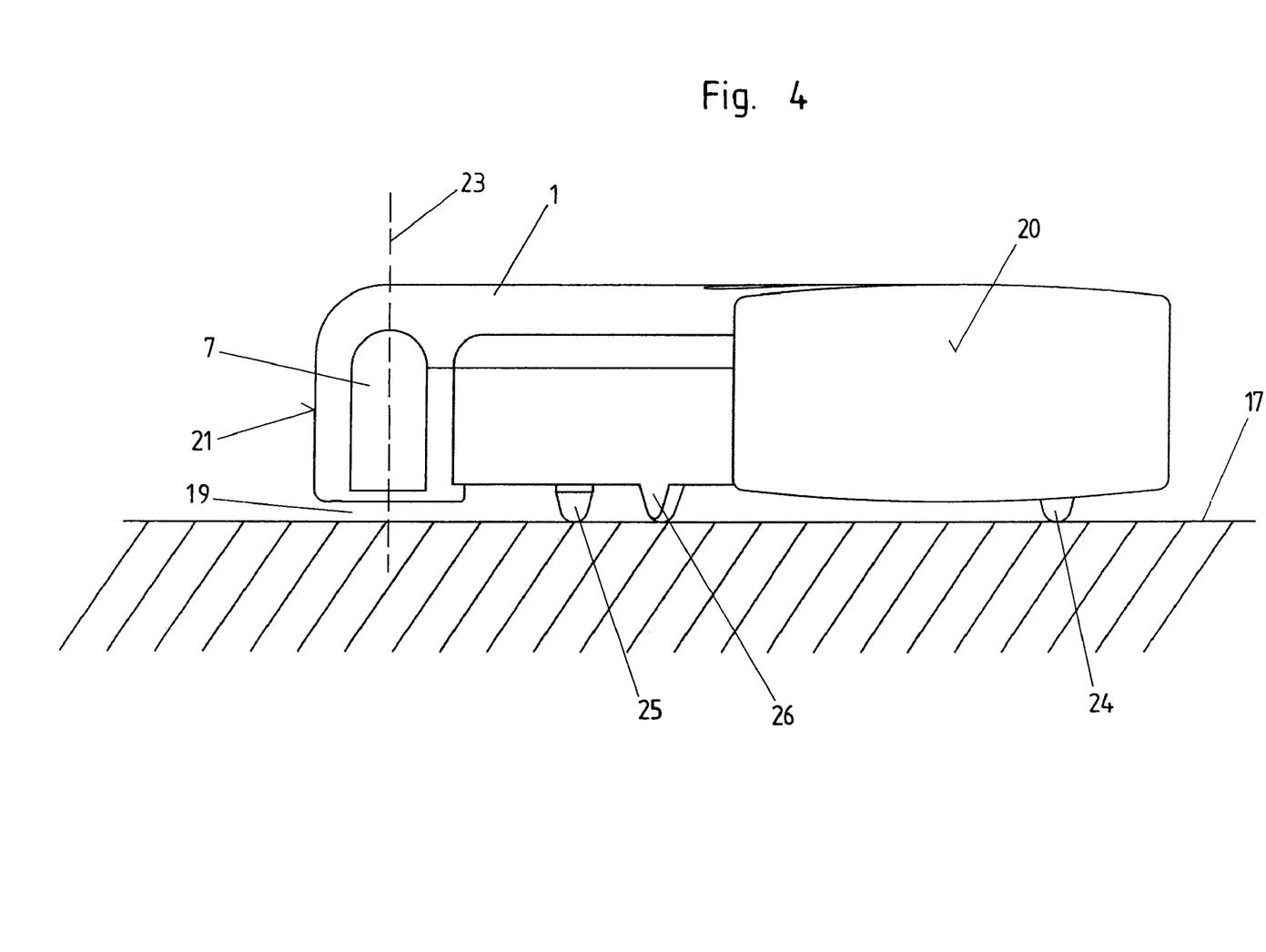
Figure 5:
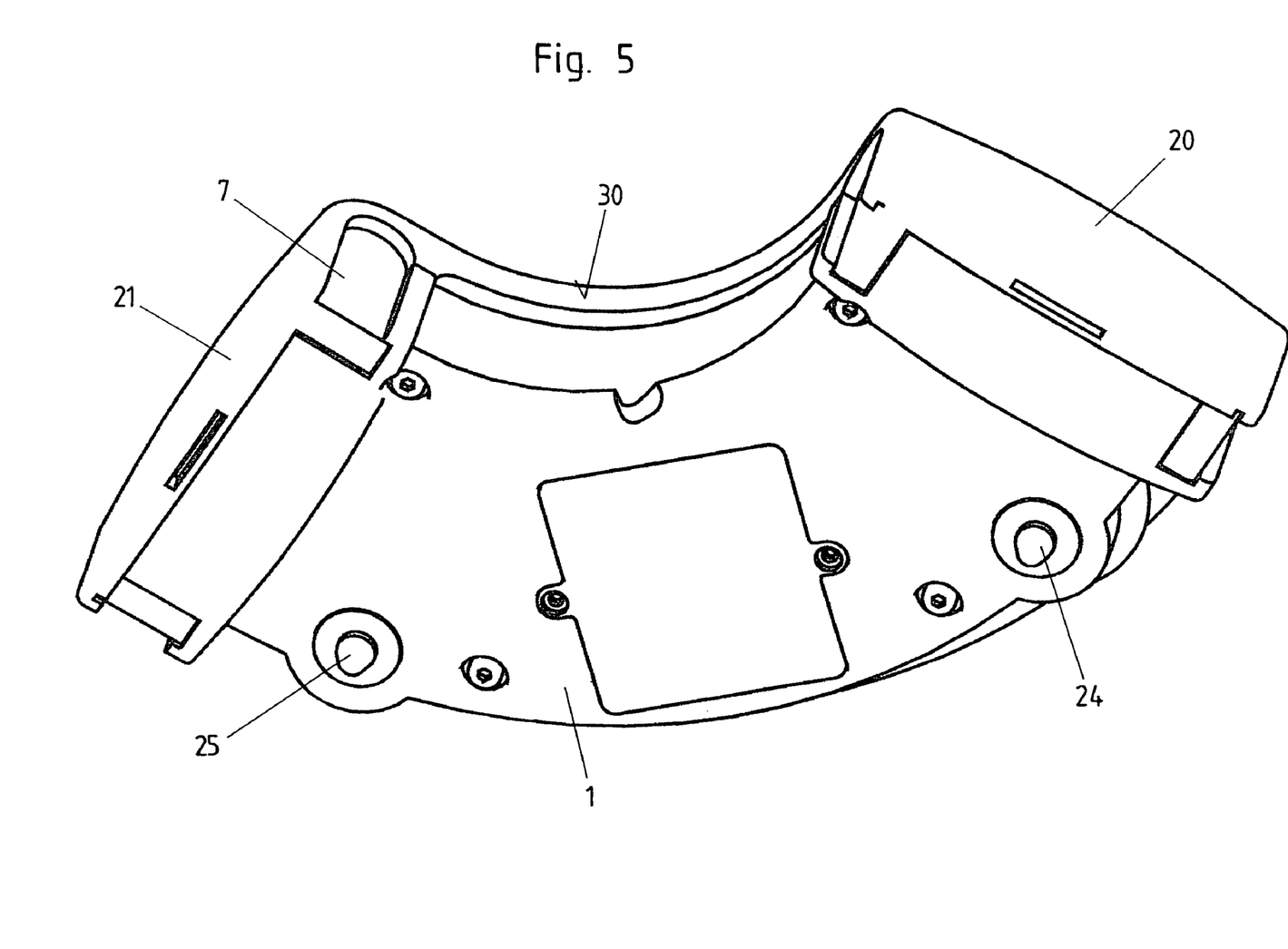
FIG. 5 a perspective view from obliquely below.

Beneath the housing 1 are developed first and second clearance zones 18, 19. In the region of these clearance zones 18, 19 the housing 1 of the cross laser device positioned on the flat substrate 17 is spaced apart from this substrate 17, such that floor covering elements, for example tiles, can be slid into these clearance zones 18, 19 under the housing 1. The alignment of the floor covering elements on the marking lines 4, 5, 11, 12 or their imaginary extensions under the housing 1 is thereby facilitated.

The first clearance zone 18 extends from the side edge 20 of housing 1 at least up to a first vertical plane 22, in which the first marking line 4 is located. The second clearance zone 19 extends from a second side edge 21 of the housing at least up to a second vertical plane 23, in which the second marking line 5 is located. The particular clearance zone 18, 19 extends here continuously over the entire region located between the particular vertical plane 22, 23 and the adjacent side edge 20, 21 and specifically over the full length of the particular side edge 20, 21 and the full length of the particular vertical plane 22, 23 across which it penetrates the housing 1.

These clearance zones 18, 19 are developed thereby that the housing 1 is positioned on the substrate by means of feet 24, 25, 26, through which the underside of the housing 1 becomes spaced apart from substrate 17, these feet 24, 25, 26 being advantageously only disposed in the region between the first and the second vertical plane 22, 23.

In the depicted embodiment example three such feet 24, 25, 26 are provided, which are located at the corners of an imaginary triangle. Two of these feet 24, 25 can preferably be height-adjustable in order to make the horizontal orientation of housing 1 possible. The horizontal orientation can herein be checked by means of a spirit level 27 (or several spirit levels).

Figure 1:
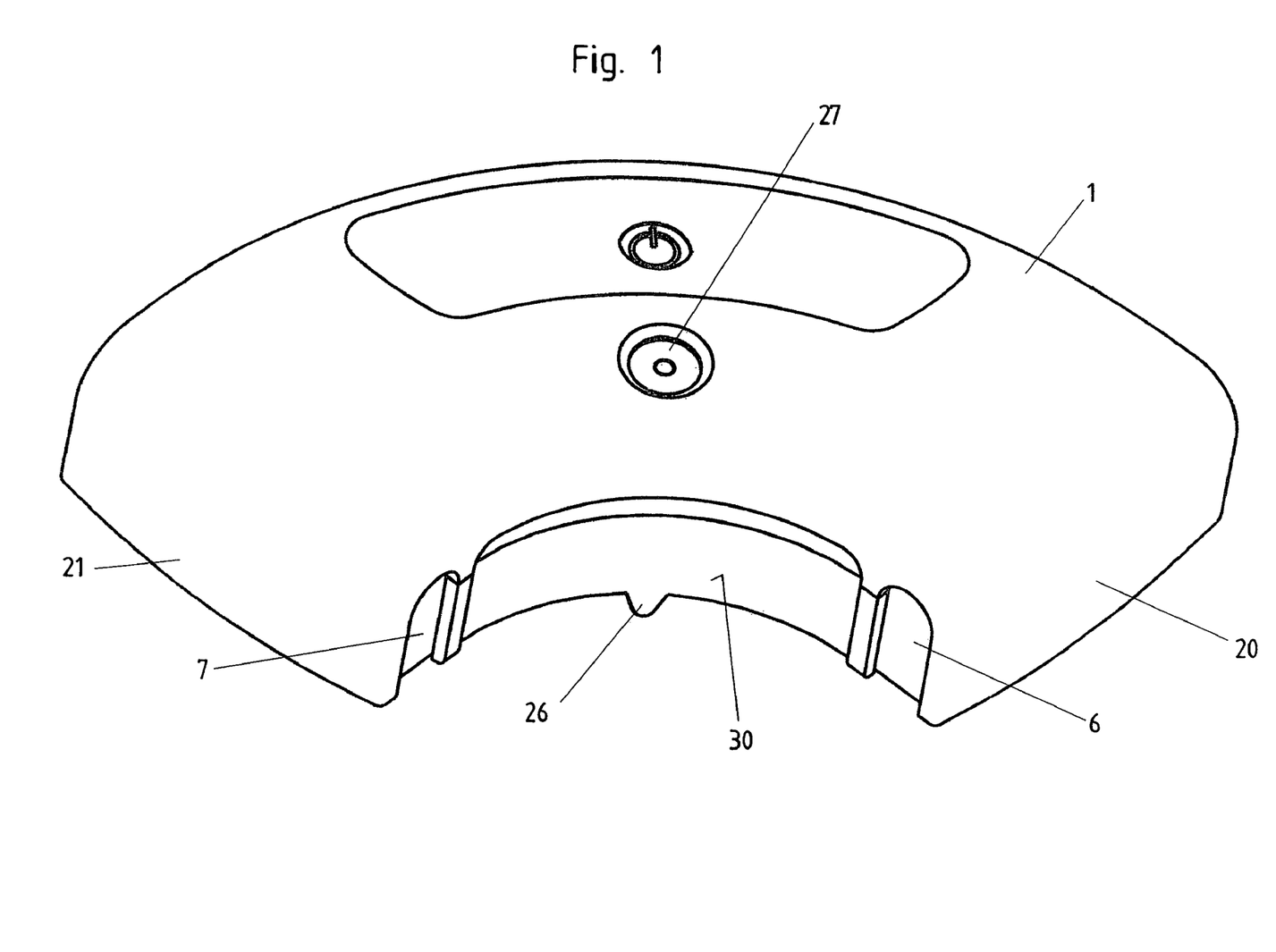
FIG. 1 a perspective view of a cross laser device according to the invention.

To adjust the height of feet 24, 25 can serve, for example and as depicted, handwheels 28, 29, which project from the backside of the housing 1.

All of the feet 24, 25, 26 can also be implemented such that they are height-adjustable. It is also feasible to provide more than three feet 24, 25, 26.

Conceivable and feasible is also the self-leveling implementation of the cross laser device, wherein the height-adjustable feet can be implemented such that their adjustment is via motor drive.

Heights h of the first and second clearance zone 18, 19, thus the distance between the housing underside and the substrate 17 in the region of the first or second clearance zone 18, 19 are adapted to the thickness of the floor covering element to be installed. Height h over the full extent of the first and second clearance zones 18, 19 is advantageously at least 10 mm.

The front side 30 and the backside 31 of housing 1, in the depicted embodiment example seen in top view, has contours in the form of circular arcs, with the intersection point 8 as the particular center of the circle.

The first and second side edges 20, 21, seen in top view, are advantageously oriented substantially parallel to the first and second marking lines 4, 5. Their discrepancies from the parallel orientation are preferably less than 15°.

Conceivable and feasible would also be providing the surface of housing 1 with first and second line markings along the intersection lines with the first and second vertical planes 22, 23.

For adaptation to the particular application, the marking lines 4, 11; 5, 12 formed by the first and third laser beam and those formed by the second and fourth laser beam can be separately switchable. Separate switching of the first and third laser beam as well as the separate switching of the second and fourth laser beam can also be provided.

A cross laser device according to the invention is also applicable for installing covering elements on walls and/or ceilings, for example for wall tiles and/or ceiling panels, and the fastening of the cross laser device on the wall or ceiling can be carried out in a manner known per se by means of suitable retaining means.

Various further modifications of the depicted embodiment example of the invention are conceivable and feasible without leaving the scope of the invention. Thus, for example, the laser beams emerging through third and fourth light exits 13, 14 from the housing for producing the third and fourth marking lines 11, 12 can be formed by division and deflection of the laser beams emitted by the first and second lasers 2, 3.

As is evident in the above description, the scope of the invention is not limited to the depicted embodiment example, but rather should be determined with reference to the attached claims together with their full range of possible equivalents.

While the preceding description and the drawing represent the invention, it is obvious to a person of skill in the art that various modifications can be carried out therein without leaving the true spirit and scope of the invention.

| Legend to the Reference Numbers | |
| --- | --- |
| 1 | Housing |
| 2 | First laser |
| 3 | Second laser |
| 4 | First marking line |
| 5 | Second marking line |
| 6 | First front light exit |
| 7 | Second front light exit |
| 8 | Intersection point |
| 9 | Third laser |
| 10 | Fourth laser |
| 11 | Third marking line |
| 12 | Fourth marking line |

-continued

| Legend to the Reference Numbers | |
|---|---|
| 13 | Third light exit |
| 14 | Fourth light exit |
| 15 | First straight line |
| 16 | Second straight line |
| 17 | Substrate |
| 18 | First clearance zone |
| 19 | Second clearance zone |
| 20 | First side edge |
| 21 | Second side edge |
| 22 | First vertical plane |
| 23 | Second vertical plane |
| 24 | Foot |
| 15 | Foot |
| 16 | Foot |
| 27 | Spirit level |
| 28 | Handwheel |
| 29 | Handwheel |
| 30 | Front side |
| 31 | Back side |

The invention claimed is:

1. A cross laser device for installing plate- or board-shaped floor covering elements on a flat substrate, comprising:
a housing including first and second front light exits, and including feet to be positioned on the substrate such that an underside of the housing is spaced apart from the substrate by the feet; and
at least one first and one second laser disposed within the housing for generating first and second laser beams emitted through the first and second front light exits of the housing so as to form first and second marking lines on the substrate, respectively, the marking lines intersecting at right angles at an intersection point spaced apart from the light exits,
wherein a first clearance zone beneath the housing extends from a first side edge of the housing at least to a first vertical plane in which the first laser beam is located, the first clearance zone extending continuously over the entire region between the first vertical plane and the first side edge,
and wherein a second clearance zone beneath the housing extends from a second side edge of the housing at least up to a second vertical plane in which the second laser beam is located, the second clearance zone extending continuously over the entire region between the second vertical plane and the second side edge.

2. The cross laser device as claimed in claim 1, wherein the distances between the first and second light exits of the housing and the intersection point are each at least 30 mm or each at least 50 mm.

3. The cross laser device as claimed in claim 1, wherein the housing includes third and fourth light exits, the cross laser device further comprising:
third and fourth lasers for generating third and fourth laser beams emitted through the third and fourth light exits of the housing so as to form third and fourth marking lines, respectively, wherein the first and the third marking lines are located in a common first straight line and the second and the fourth marking lines are located in a common second straight line.

4. The cross laser device as claimed in claim 3, wherein the third and fourth marking lines each have a length of at least 4 m on the flat substrate.

5. The cross laser device as claimed in claim 1, wherein the first and second clearance zones have heights of at least 7 mm over their full extents beneath the housing.

6. The cross laser device as claimed in claim 5, wherein the first and second clearance zones have heights of more than 10 mm over their full extents beneath the housing.

7. The cross laser device as claimed in claim 1, wherein the first and second marking lines each have a length of at least 4 m on the substrate.

8. The cross laser device as claimed in claim 1, wherein a front side of the housing, as viewed in a top view, has a contour in the form of a circular arc.

9. The cross laser device as claimed in claim 8, wherein a center of the circular arc coincides with the intersection point of the first and second marking lines.

10. The cross laser device as claimed in claim 1, wherein a backside of the housing, as viewed in a top view, has a contour in the form of a circular arc.

11. The cross laser device as claimed in claim 10, wherein a center of the circular arc coincides with the intersection point of the first and second marking lines.

12. The cross laser device as claimed in claim 1, wherein the first and second side edges, as viewed in a top view, extend substantially parallel to the first and second marking lines.

13. The cross laser device as claimed in claim 1, wherein the feet are only disposed in a region between the first and second vertical planes.

* * * * *